United States Patent
Hipp

(10) Patent No.: US 10,901,072 B2
(45) Date of Patent: Jan. 26, 2021

(54) APPARATUS AND METHOD FOR THE RECORDING OF DISTANCE IMAGES

(71) Applicant: Triple-IN Holding AG, Zug (CH)

(72) Inventor: Johann Hipp, Hamburg (DE)

(73) Assignee: TRIPLE-IN HOLDING AG

( * ) Notice: Subject to any disclaimer, the term of this patent is extended or adjusted under 35 U.S.C. 154(b) by 910 days.

(21) Appl. No.: 15/474,205

(22) Filed: Mar. 30, 2017

(65) Prior Publication Data

US 2017/0285148 A1 Oct. 5, 2017

(30) Foreign Application Priority Data

Mar. 30, 2016 (DE) .......................... 10 2016 105 804
Aug. 12, 2016 (DE) .......................... 10 2016 114 995

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4808* (2013.01); *G01S 7/4814* (2013.01); *G01S 7/4815* (2013.01);
(Continued)

(58) Field of Classification Search
CPC ........ G01S 7/4817; G01S 7/497; G01S 17/42; G01S 7/4808; G01S 7/4814; G01S 7/4815; G01S 17/89; G01S 7/481
See application file for complete search history.

(56) References Cited

U.S. PATENT DOCUMENTS 5,552,893 A 9/1996 Akasu
5,562,096 A * 10/1996 Hossack .................. A61B 8/12
600/446

(Continued)

FOREIGN PATENT DOCUMENTS

DE 102004014041 A1 10/2005
EP 1522870 A1 4/2005
(Continued)

*Primary Examiner* — Samantha K Abraham
(74) *Attorney, Agent, or Firm* — Dickinson Wright PLLC

(57) ABSTRACT

An apparatus in accordance with the invention for the recording of distance images each having a plurality of distance image points comprises a plurality of transmitters arranged in an array respectively for the transmission of electromagnetic radiation into a recording region and at least one reception unit for the detection of radiation reflected from the recording region, an evaluation unit for determining distances of objects at which the transmitted radiation is reflected, with the distances each forming a distance image point, a deflection unit which repeatedly deflects the transmitted radiation within a scanning angle region into a scanning direction in order to consecutively generate a plurality of scanning patterns of distance image points per distance image, and a displacement unit that displaces consecutive scanning patterns against one another in a displacement direction by way of relative movements of optical elements, wherein each distance image comprises a plurality of scanning patterns of distance image points displaced against one another.

17 Claims, 7 Drawing Sheets

(51) Int. Cl.
  *G01S 7/497* (2006.01)
  *G01S 17/42* (2006.01)
  *G01S 7/48* (2006.01)
  *G01S 17/89* (2020.01)

(52) U.S. Cl.
  CPC .............. *G01S 7/497* (2013.01); *G01S 17/42* (2013.01); *G01S 17/89* (2013.01)

(56) References Cited

U.S. PATENT DOCUMENTS

| | | | |
|---|---|---|---|
| 7,787,105 B2 * | 8/2010 | Hipp | G01S 7/481 |
| | | | 356/5.03 |
| 2007/0181810 A1 | 8/2007 | Tan et al. | |
| 2008/0186470 A1 * | 8/2008 | Hipp | G01S 7/4815 |
| | | | 356/5.08 |

FOREIGN PATENT DOCUMENTS

| | | |
|---|---|---|
| EP | 1522893 A2 | 4/2005 |
| EP | 1901093 A1 | 3/2008 |

* cited by examiner

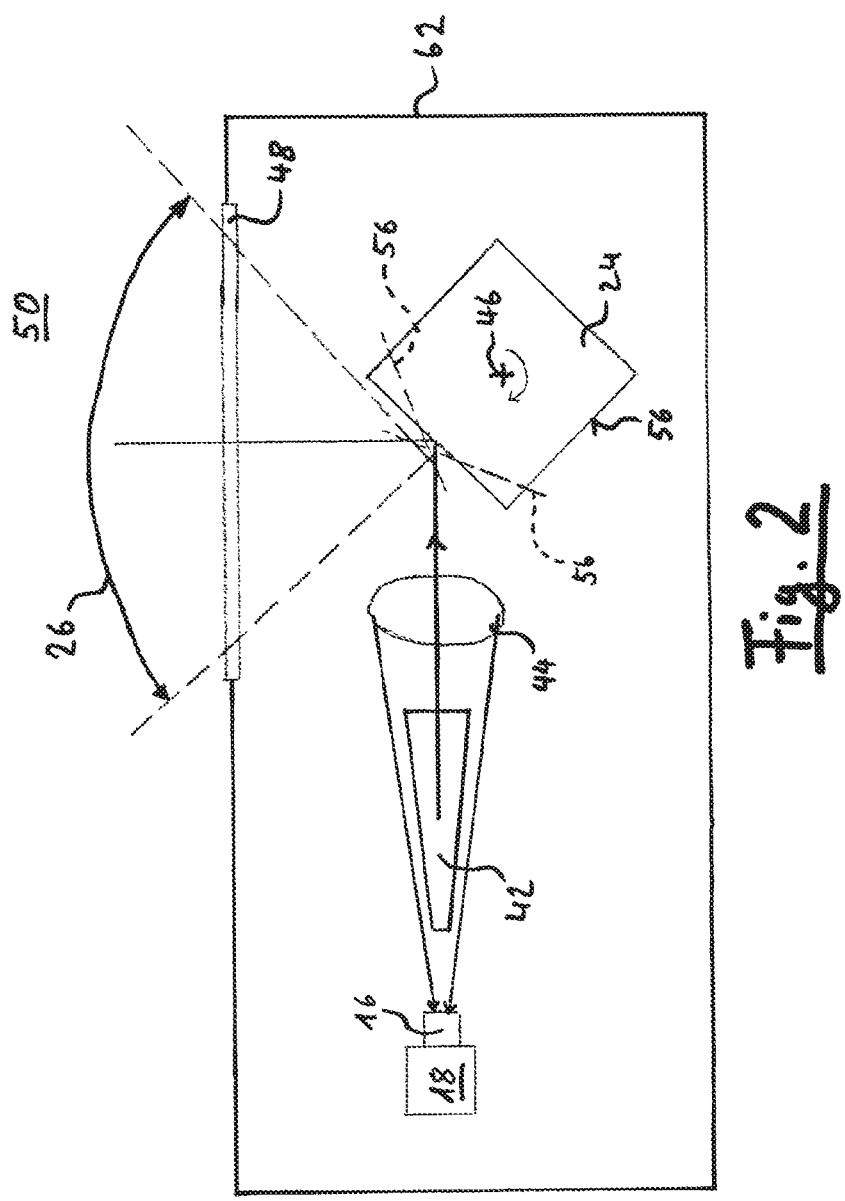

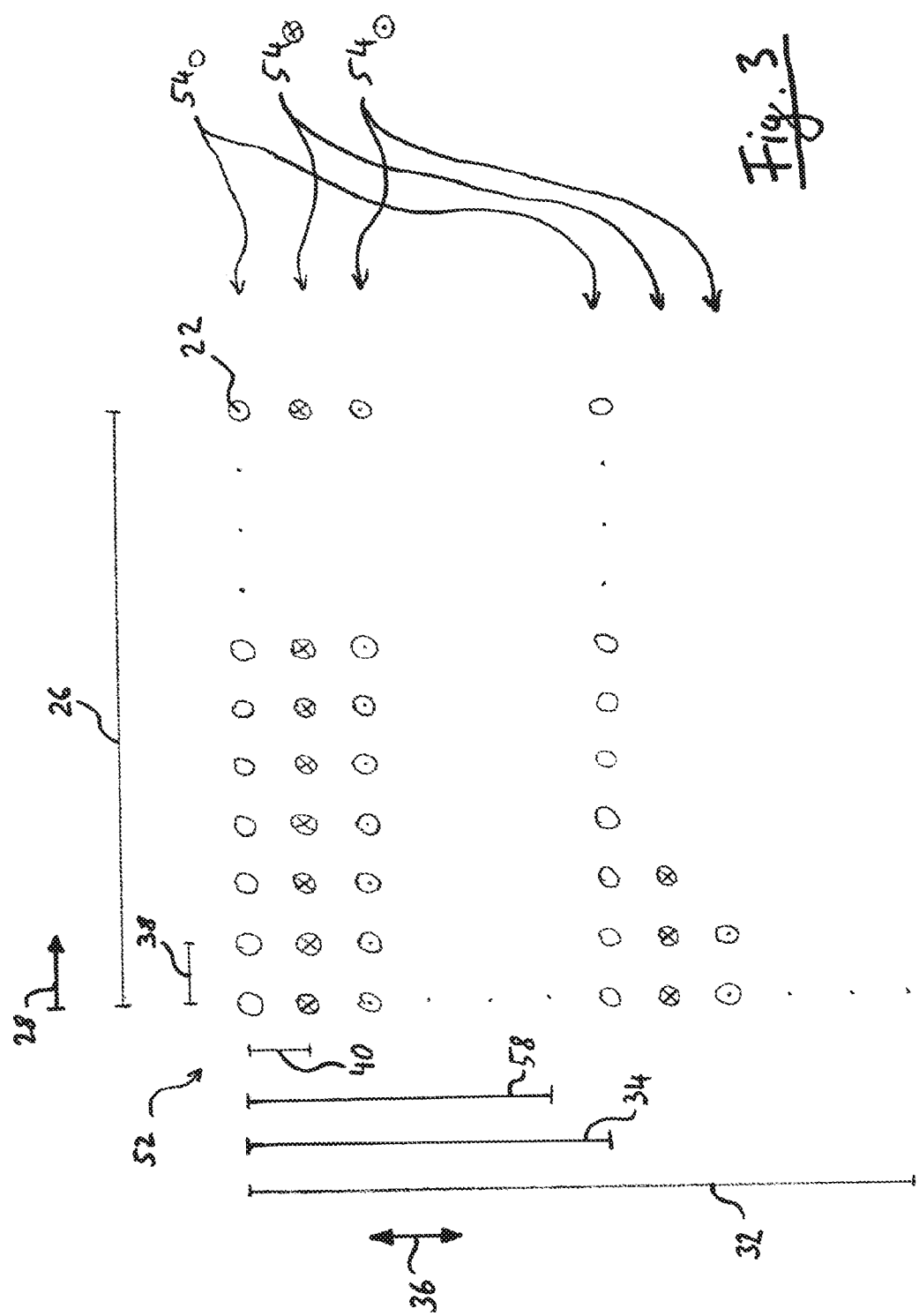

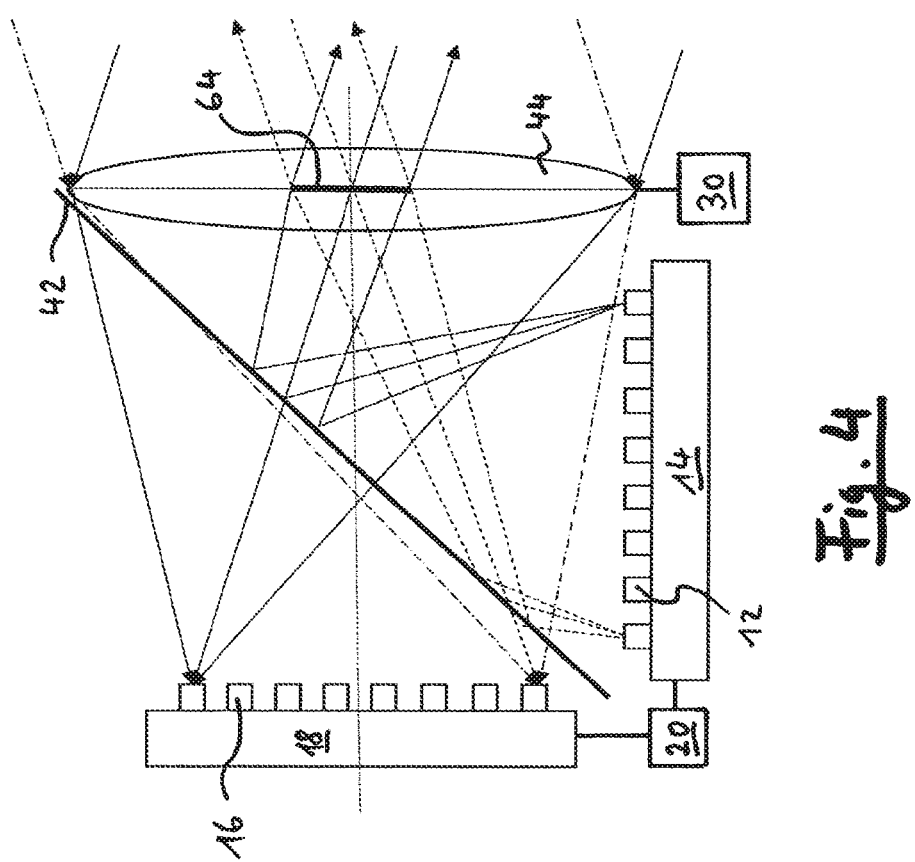

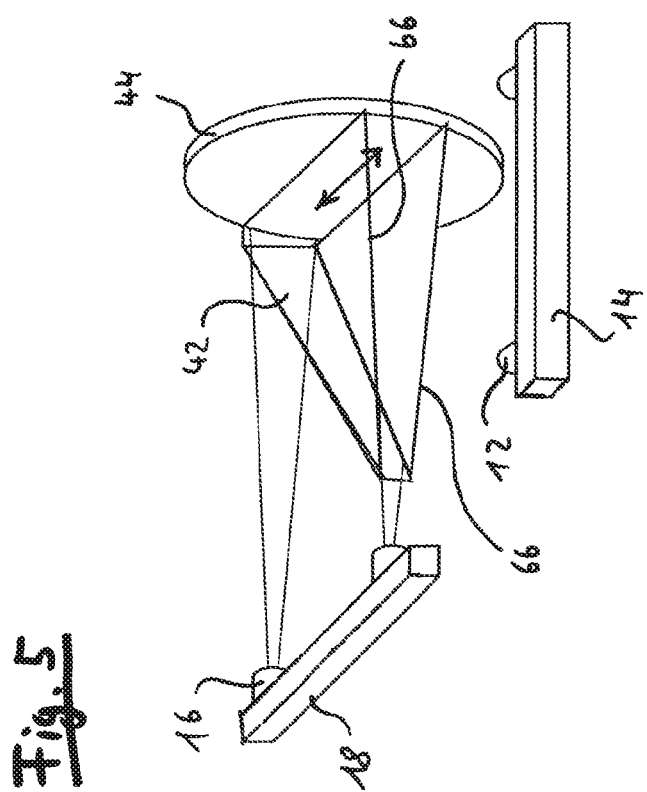

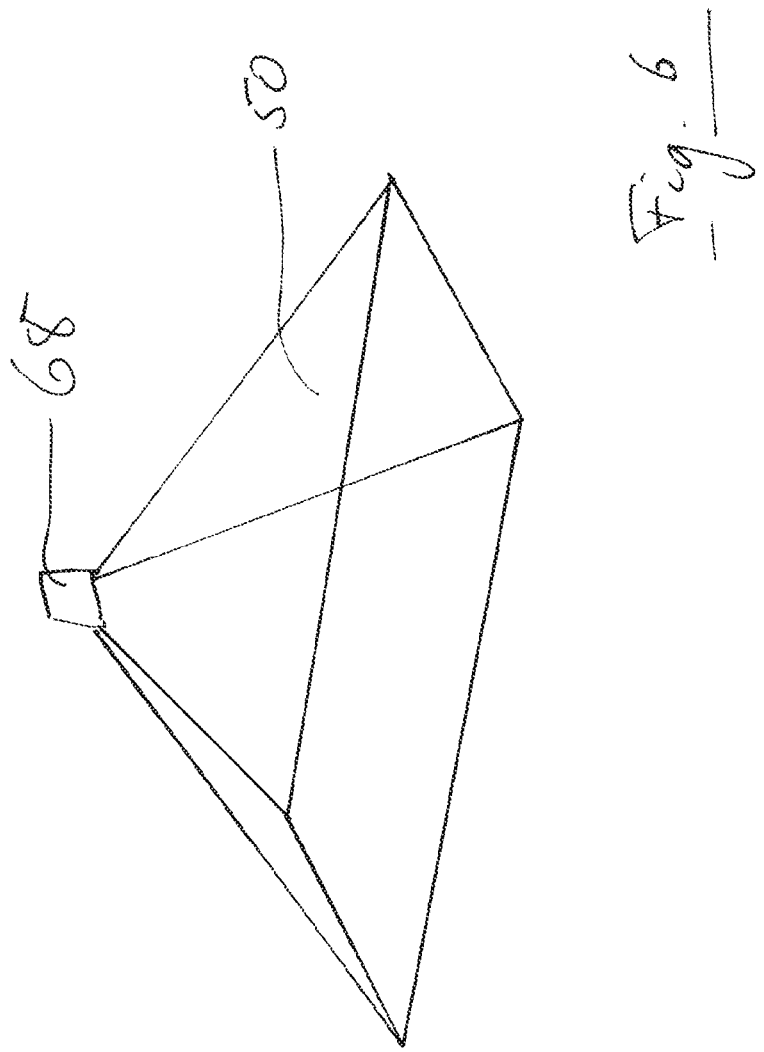

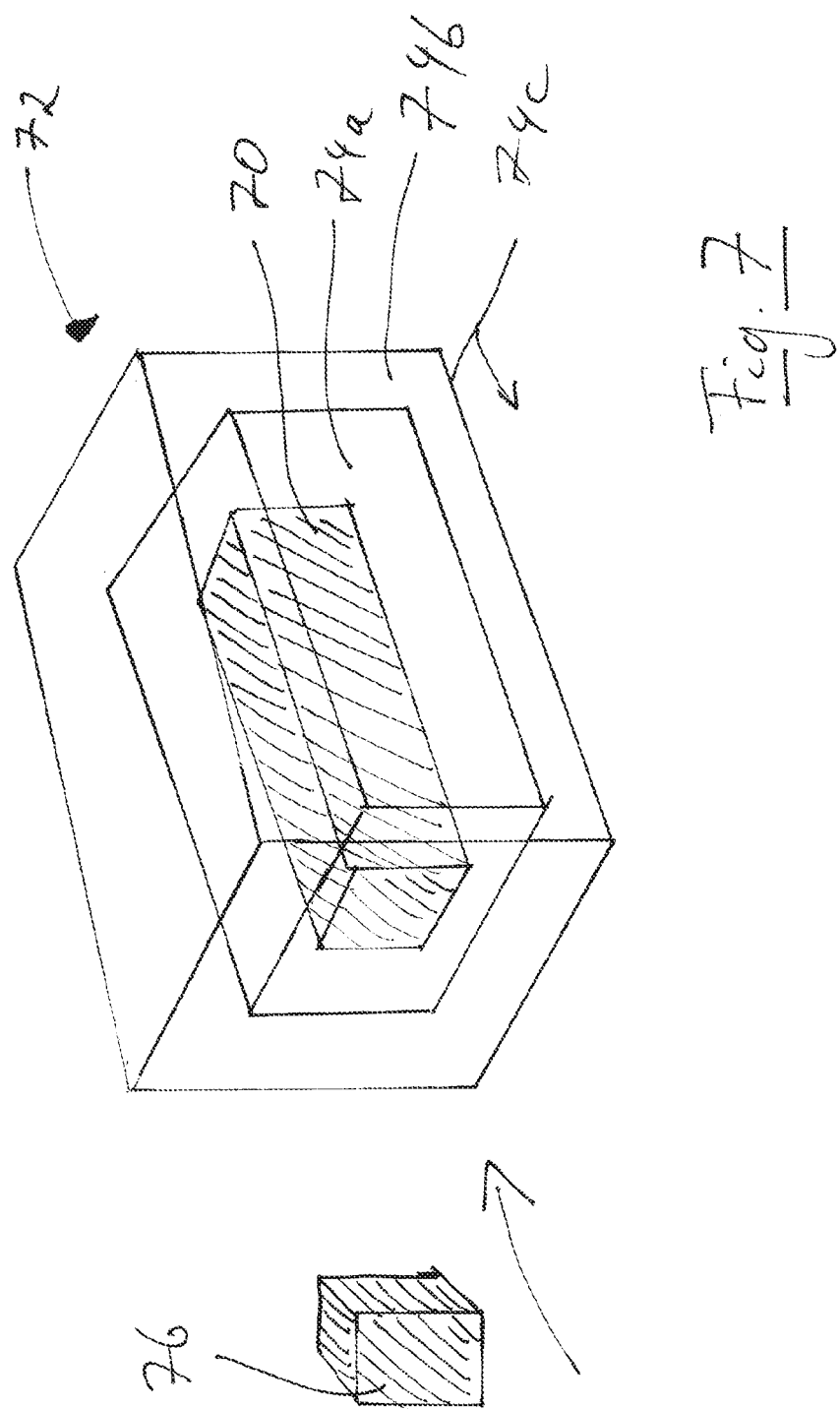

APPARATUS AND METHOD FOR THE RECORDING OF DISTANCE IMAGES

CROSS REFERENCE TO RELATED APPLICATIONS

This application claims priority to DE102016105804.1, filed 30 Mar. 2016 and DE102016114995.0 filed 12 Aug. 2016, both of which are hereby incorporated by reference in their entirety.

The present invention relates to an apparatus as well as to a method for the recording of distance images each having a plurality of distance image points, comprising a plurality of transmitters arranged in an array respectively for the transmission of electromagnetic radiation into a recording region, at least one reception unit for the detection of radiation reflected from the recording region and an evaluation unit for determining distances of objects at which the transmitted radiation is reflected, with the distances each forming a distance image point.

Distance images are, for example, recorded in order to recognize and to localize surfaces of objects in three-dimensional space, this means in order to generate 3D images of the object. Known apparatuses localize surface points on the object by means of laser and a measurement of the time of flight of a laser beam from the apparatus to a distance image point at the object and back.

So-called line scanners are known that comprise a pulsed laser source whose laser pulses are repeatedly deflected by way of a rotating mirror in order to distribute distance image points over a scanning angle over the object. The so determined distance image points lie on a line from the point of view of the scanner. Such line scanners can be mounted on a support that carries out a defined movement in order to three-dimensionally scan a surrounding area of the support. For example, such a line scanner can be mounted on a train in order to three-dimensionally measure a tunnel.

Alternatively it is known, for example, in the field of measurement technology to mount a line scanner on a rotating foot in order to gradually displace the image point lines of the line scanner perpendicular to the scanning line, in such a manner that a three-dimensional 360° image of the environment of the line scanner can be recorded.

The said apparatus respectively the methods are generally suitable for the generation of individual 3D-images. It is however disadvantageous that the complete line scanner has to be moved. Hereby the achievable scanning speed is considerably limited for mechanical reasons in such a way that a fast consecutive recording of several 3D-images, for example at an image rate in the range of 1 to 10 Hz, is practically impossible. Moreover, a rotating scanner has been found to be disadvantageous in many applications for reasons of maintenance and safety.

It is an object of the invention to provide an apparatus respectively a method for the recording of distance images each having a plurality of distance image points that enable an as high as possible distance image rate in a reliable manner and with an as low as possible demand in construction and cost.

This object is satisfied by an apparatus in accordance with claim 1 and in particular thereby that a deflection unit is provided which repeatedly deflects the transmission radiation within a scanning angle region in a scanning direction in order to consecutively generate a plurality of scanning patterns of distance image points per distance image and in that a displacement unit is provided that displaces consecutive scanning patterns against one another in a displacement direction by way of relative movements of optical elements, wherein each distance image comprises a plurality of mutually displaced scanning patterns of distance image points.

In accordance with the invention an arrangement and a distribution of distance image points can thus be realized in the recording region by way of a movement, in particular merely of the optical elements relative to one another. The optical elements are generally small and in this way have a low mass in such a manner that relatively high movement speeds are possible without excessive effects with respect to inertia arising. Hereby mechanical limits of the speed are suspended or at least shifted in such a manner that a high distance image rate is made possible.

Moreover, the optical elements can advantageously be arranged in a common housing in such a way that no outwardly facing movable parts are present. This simplifies the maintenance and improves the safety.

In accordance with the invention it has been recognized that only a relatively small recording region is required for many applications; however, in exchange for a comparatively high image rate. Whereas the initially described apparatus of the measurement technology can essentially scan the complete surroundings, this means 360° about the axis of rotation of the line scanner, many cases of application are plausible in which—as is the case for the human eye—only a limited viewing angle is required. Such a case is, for example, the automated engagement of a load receiver at an object, such as for example with container cranes. However, a relatively fast image rate is required with regard to the automatic control and monitoring of a load receiving process. The apparatus in accordance with the invention can thus, for example, be assembled in a defined position at the load receiver in such a way that, in particular its limited recording region, is directed at the object. Hereby a fully automatic 3D control of the load receiver can be realized relative to the object and indeed, in particular without any specific referencing means having to be applied at the object. A 360° scanning is in this respect not required.

The arrangement of the transmitter in a transmitter array leads thereto that the scanning pattern already has a plurality of scanning columns of distance image points and indeed corresponding to the number of transmitters in the array. Thus, already without a displacement unit, a certain resolution of the distance image in a direction towards, in particular perpendicular to, the scanning direction can be realized. The displacement unit in accordance with the invention now, moreover, serves the generation of additional scanning patterns in the displacement direction, whereby the resolution in the displacement direction is further increased.

The term resolution in the framework of this disclosure relates to an angular spacing between two distance image points. The resolution is in this way not dependent on the spacing of the object to the apparatus, however, the absolute spacing between two adjacent distance image points enlarges with an increasing spacing of the object to the apparatus. The respective resolution can be different in the scanning direction and in the displacement direction.

In accordance with the invention thus a relatively high image rate is achieved by way of an advantageous combination of the displacement unit with the plurality of transmitters arranged in an array. This combination allows the effect that a respectively only relatively small displacement path has to be taken for a respective distance image by means of the displacement unit, as all transmission rays or bunches of transmission rays are commonly displaced. Such small movements can be realized for light and small optical elements also with relatively high frequencies which results in a comparatively high image rate. As only a small displacement path is necessary, the displacement process can also be referred to as a small angle scan.

In particular, the transmitters and/or a plurality of receivers can be arranged in a line with a constant spacing between two directly adjacent transmitters or receivers, wherein the displacement unit merely brings about a movement in the direction of the line around a path for a respective distance image that is smaller than or equal to this transmitter or receiver spacing.

In particular the relative movements of the optical elements can be freely controlled by means of the displacement unit, in particular having regard to the speed or the speed profile in time. For example, for a corresponding control of the evaluation unit and/or of the deflection unit, in particular for constant activity, this means e.g. for a pulse rate of the transmitters constant in time, it can be achieved that the resolution of the recorded distance images can be essentially freely selected within certain ranges. The resolution is in this respect in particular settable in dependence on the image rate, wherein, in particular for high image rates, a more coarse resolution can be selected.

Thus, for example, in the case of the so-called container crane, the image rate can be set low and the resolution can be set fine when the load receiver is still far away from the object to be recorded, this means the container. In this state a sufficiently absolute small spacing of distance image points to the object can be realized and a high image rate is not required, as the load receiver merely has to be controlled coarsely in the direction of the object. However, when the load receiver comes close to the object, then the image rate can be increased at the cost of a more coarse resolution. In this respect the absolute spacing of the distance image points to the object remains sufficiently small, in contrast to which also faster movements of the object relative to the load receiver can now be securely recognized due to the higher image rate. Image rate and resolution can thus be adapted, in particular online, in accordance with requirements.

The respective distances are determined, for example, by measuring the radiation time of flight. This can, for example, be realized with transmitters configured as laser sources that transmit a plurality of laser pulses. From the time of flight of these laser pulses between transmitter and receiver, which is abbreviated as TOF, the respective distances can be calculated. Alternatively or additionally the transmitter can however, also continuously transmit radiation and/or the distances can be determined by means of a phase shift between the transmitter and the receiver.

In particular the transmitter array, the deflection unit and an optics present, in particular in the optical path, between the transmitter and deflection unit in the preferred embodiment of the invention is to be understood as an optical element in the sense of the invention.

Having regard to an embodiment, the displacement unit comprises a movable optics, in particular a prism, a mirror or a lens, preferably a common transmission and reception lens. The optics can also comprise a plurality of the respectively mentioned elements or combinations thereof. In particular, a plurality of lenses can be provided that commonly form an objective. The optics is in particular translatory movable. This permits a particularly compact manner of construction of the apparatus, for example, in comparison to rotating movable optics.

The displacement unit can comprise an actuator that moves an optics arranged between the transmitter array and the deflection unit and/or the transmitter array relative to the deflection unit. In principle, it would alternatively or additionally also be possible to tilt the deflection unit and/or to move two or more optical elements. It has been found advantageous to move the optics, in particular a lens, as this does not require an electrical connection to a supply of energy, in particular in contrast to the transmitter array. For this reason a particularly simple design comprises a lens movable by means of an actuator configured in whatever possible way. The lens can in this respect be moved in parallel to an axis of rotation of a deflection unit configured as a rotating mirror.

In particular the optics and/or the transmitter array can be displaced in a motorized manner, with the transmitter array in particular being able to be displaced together with the reception array. This can, for example, be realized by way of an eccentric element coupled to a drive shaft that also acts on the optics respectively on the transmitter array. Also a cam guide for the periodic displacement of the optics or respectively of the transmitter array can be provided, with the cam guide cooperating with a drive shaft. For example, the actuator can alternatively or additionally comprise a piezo-actuator.

Having regard to a further embodiment, a displacement movement that can be generated by means of the displacement unit is a periodic to and fro movement. The to and fro movement can e.g. proceed essentially sinusoidally in the speed profile, at least regionally have an essentially constant speed and/or have at least one stop, in particular a plurality of stops. In particular, the displacement movement can have a displacement amplitude that corresponds to the spacing between two transmitters lying directly adjacent to one another or that is smaller than this. Alternatively or additionally the displacement movement can have a displacement frequency that lies below a few ten Hz, in particular between a few Hz and a few ten Hz. The displacement frequency can also be set within these limits. In particular the displacement frequency corresponds to the one-fold or the two-fold of the image rate.

Having regard to an embodiment the transmitter array has a maximum longitudinal extent and a maximum transverse extent perpendicular to the longitudinal extent, wherein the transverse extent is smaller than the longitudinal extent, in particular a multiple times smaller than the longitudinal extent. In particular, the transmitters in the array can be arranged in a straight line, wherein preferably the transmitters are uniformly spaced apart along the straight line.

With regard to a further embodiment, the scanning direction extends in parallel to an effective longitudinal extent of the transmitter array, in particular to an image of the transmitter array or to a series of transmission bunches of radiation after passing a radiation splitter, wherein the displacement direction extends perpendicular to the scanning direction and in particular in parallel to the effective longitudinal extent of the transmitter array. The actual physical arrangement of the individual transmitters in the apparatus does not necessarily relate to the effective longitudinal extent, but rather the relative positioning of the expanding transmission radiation respectively of the transmission bunches of radiation of the transmitters in a propagation region in front of the deflection unit.

This embodiment permits a particularly compact manner of construction of the apparatus. Moreover, this embodiment optimizes the preferred more general concept of the invention, of using an array arrangement of transmitters—in particular a series arrangement of the transmitters—to such an extent that a relatively large scanning angle region (that can e.g. be realized in a simple manner with a single rotating mirror) is only required in one direction—in particular perpendicular to the effective longitudinal extent of this series—and such that only a comparatively small displacement angular region (that can, for example, be realized by way of a small translational movement of one or more optical elements and subsequently does not require a second rotational movement and in this way does not require a second rotating mirror or a rotation of the apparatus as a whole) differing therefrom—in particular perpendicular thereto—is required.

With regard to an advantageous design, the number of transmitters can lie between 4 and 24 and in particular amount to 8 or 16. Alternatively or additionally the spacing between two transmitters that lie directly adjacent to one another can lie in the range of 4 to 12 mm, in particular amount to approximately 6 mm. Alternatively or additionally, the maximum longitudinal extent of the transmitter array can lie in the range of 32 to 96 mm, in particular amount to approximately 42 mm. Alternatively or additionally, the spacing between the two transmitters lying directly ajacent to one another can correspond to a transmission angle in the range of 2° to 12°, in particular correspond to 2° to 6°, in particular to approximately 4.3°. The said value ranges and values respectively taken on their own, in particular however also in any arbitrary specific combination, represent an advantageous compromise between construction size, manufacturing cost and achievable values for the image rate and resolution.

Having regard to an embodiment an optics arranged between the transmitter array and the deflection unit is configured in such a way that a difference in divergence, present in two directions standing perpendicular to one another, of each transmitter is reduced and in particular should at least be compensated as far as possible. Such a difference in divergence can, for example, be founded therein that a laser diode is used as a transmitter. Many such laser diodes have no point-like radiation characteristics—as would be desirable in many cases of application—but rather have a different beam shape, e.g. an essentially rectangular beam shape, this means have a difference in divergence. Such a difference in divergence can, for example, be compensated by a suitable shape of the optics, in particular of the lens, and/or by screen elements, such as e.g. black surfaces.

The deflection unit can advantageously be a rotating mirror. In particular an axis of rotation of the rotating mirror can extend in parallel to the displacement direction. This particularly simple embodiment likewise serves a particularly compact manner of construction. The deflection unit can alternatively or additionally be configured as a polygonal mirror that is provided with a plurality of n deflection surfaces that can consecutively be impinged by the transmission radiation that each cover the same angular range of at least approximately 360°/n, wherein preferably n is an even number or n=2, 3, 4, 5, 6, 7 or 8, in particular n=3, 4 or 5.

An embodiment of the invention provides that the recording region corresponds to a spatial angle of D×V that can be covered by means of the transmission radiation, wherein D is the scanning angle region that can be covered by means of the deflection unit and V is the displacement angular region that extends perpendicular to the scanning angle region and that results from the sum of the corresponding extent of the transmitter array and a predefined offset that can be generated by means of the displacement unit and wherein D preferably approximately lies in the range of 45° to 180°, in particular between 45° and 120°, and V approximately lies in the range of 12° to 72°, in particular between 12° and 45°.

As a radiation source the transmitters can respectively e.g. comprise a laser, in particular a GaAs laser diode or a fiber laser or an LED. The use of diodes has advantageous effects in this regard with respect to cost and construction space. In particular GaAs laser diodes are comparatively cost-effective and at the same time make available a good performance in that they, for example, in particular in connection with an arrangement of the laser diodes in an array, enable a pulse rate that is sufficient for relatively high image rates for TOF measurements.

Having regard to a further embodiment the reception unit comprises a plurality of receivers arranged in an array, wherein preferably precisely one transmitter is associated with each receiver and vice versa.

The receiver or the receivers can be arranged separate from the transmitters. For example, a beam splitter can be arranged in the optical path between the deflection unit and the transmitter array that deflects a part of the radiation reflected from the recording region to the reception unit. Alternatively or additionally the transmitters and reception unit can respectively have their own optics, e.g. a lens and/or be arranged in such a manner that optical axes of the transmitters and reception unit are aligned at least essentially in parallel to one another. Such an arrangement can also be referred to as a parallel optical system.

The aforementioned beam splitter can in particular be configured as a geometric beam splitter. The beam splitter in particular comprises an at least essentially completely reflecting mirror and in particular no partly permeable mirror. In particular the geometric beam splitter separates a transmission radiation region and a reception radiation region from one another. By way of e.g. strip-shaped, in particular rectangular or trapezoidal geometric beam splitters a range of the apparatus can be improved, in particular in contrast to a beam splitter designed as a partly permeable mirror. The geometric beam splitter can likewise be configured as comparatively narrow for relatively narrow transmission bunches of radiation in such a way that only a small part of a lens surface has to be covered by the geometric beam splitter in such a way that, in turn, the remaining lens surface which permits a reflection to the receivers is relatively large. This means that less radiation power is lost at the geometric beam splitter than, for example, at a partly permeable mirror.

In an embodiment the transmission radiation region is screened from the reception radiation region. The reception unit in this connection is in particular optically screened with respect to the transmitters in such a way that radiation transmitted from the transmitters cannot arrive at the reception unit without the radiation passing through the recording region and being reflected by the object. Black surfaces that laterally bound the transmission radiation are, for example, provided for screening.

Having regard to an advantageous embodiment the transmitter array, the reception unit, the deflection unit and the displacement unit are arranged in a common closed housing. In this way it is ensured that no movable parts are required outside of the housing and in this way a high degree of safety and a simple maintenance is ensured. In particular the housing has a common outlet window for the radiation transmitted into the recording region and for the radiation reflected from the recording region.

Having regard to a further embodiment the apparatus has a common transmission and reception lens, wherein in particular the transmitters are aligned with respect to the lens in such a way that the transmission radiation passes a common middle region of the lens, this means that respective transmission bunches of radiation pass a common middle region of the lens. Hereby range and accuracy can be improved, as the lens generally has better optical properties in the middle region than in the boundary region. Alternatively, the transmitters can be arranged with respect to the lens in such a manner that bunches of radiation from the transmitters are incident in parallel to one another at the lens in such a way that the transmission radiation exiting the lens converges and e.g. intersects at an outer focal point. This embodiment permits a particularly compact design of the apparatus, as the deflection unit in this connection can be configured relatively small.

In particular a bunch of radiation transmitted by a respective transmitter can be irradiated divergent by each transmitter and be parallelized by way of an optics, e.g. a lens, preferably a common transmission and reception lens, in order to enable a high range.

Having regard to a further development the evaluation unit has a plurality of time measurement units for determining the distances on the basis of a respective radiation time of flight. In this connection a time measurement unit can be associated with each transmitter. Alternatively, a respective time measurement unit can be associated with at least two transmitters. In this connection the individual time of flight measurements can be processed by means of multiplexing. In particular, the time measurement units can thereby be operated and evaluated in parallel. The functional principle of time measurement units for the recording of distance images is described in detail in EP 1 901 093 A1 whose disclosure is hereby included by way of reference. The evaluation unit can, for example, comprise one or more so-called KEMICs, as is described in the aforementioned document, as well as in the EP 1 522 870 A1 whose disclosure is hereby included by way of reference. Hereby, in particular a transmitter array, a receiver array and a time measurement array as are disclosed in the aforementioned documents can be combined with one another.

Furthermore, the apparatus can be configured in such a way that no image rotation arises during a movement of the deflection unit. In this connection the deflection unit can, for example, be configured as a rotatable polygonal mirror. The distance image can be calculated and represented in a more simple manner by way of the avoidance of the image rotation.

The object of the invention is also satisfied by a method in accordance with claim 19. The method can in particular be carried out by way of an apparatus described herein and/or can be further developed in the sense of this apparatus. Vice versa also the apparatus in accordance with the invention can be developed further in the sense of any herein described embodiments of the method in accordance with the invention.

The method further relates to a method of operating, in particular for self-diagnostics, an apparatus for the recording of distance images each having a plurality of distance image points. The apparatus can in particular be a herein described apparatus. Having regard to the method, electromagnetic radiation is transmitted into a recording region by means of a plurality of transmitters arranged in an array and radiation reflected from the recording region is detected by means of at least one detection unit. The distances of objects at which the transmitted radiation is reflected are determined, with the distances each forming a distance image point. The transmission radiation is repeatedly deflected within a scanning angle region into a scanning direction in order to consecutively generate a plurality of scanning patterns of distance image points per distance image. Hereby consecutive scanning patterns are displaced against one another in a displacement direction, in particular by means of relative movements of optical elements, wherein each distance image is formed from a plurality of scanning patterns of distance image points displaced against one another. Furthermore, distance image points transmitters and/or sets of distance image points stemming from at least two different are compared to one another, in particular a plurality of times at regular or irregular spacings in time. A tolerance lying outside of a pre-definable or predetermined deviation is treated as a non-intended state, in particular as an interference or as an error.

Hereby the circumstance is utilized that due to the plurality of transmitters a plurality of "individual distance measurers" working in parallel are so to say present and for this reason redundancy is given that can be used to recognize a non-intended state of the apparatus. This can, e.g. be founded therein that one of the transmitters or—if an own receiver is associated with each transmitter—one of the receivers does not work correctly or if an electronic error of whatever kind is present. The presence of such an interference at the same time for both "individual distance measurers" is extremely unlikely which is why in the case of a deviation recognized by the comparison the conclusion can be drawn that an interference is present in one of the two "individual distance measurers".

The invention is thus based on the recognition that, for a recording apparatus that comprises a plurality of transmitters or individual distance measurers, these can not only be used for the improvement of the scanning speed and the resolution, but at the same time practically without an excess in demand in effort and cost also for self-diagnostics or a safety function.

In this way the apparatus in accordance with the invention can satisfy high requirements with regard to safety, as in the case of a recognized interference the apparatus can signalize this or notify this or can take a different kind of safety measure of whatever design. The safety of the recording apparatus or a larger installation operated with its aid, such as e.g. a measurement system, a vehicle or a transport or handling apparatus, such as for example, a crane can be reliably established in this manner. In particular an at least partly automated work process can be monitored by means of an apparatus of the aforementioned described kind and/or the aforementioned described method, wherein, in the case of a non-intended state, the work process can be adapted and/or stopped.

It is of advantage, that the comparison of the distance image points, this means of the corresponding measurement values, can take place in parallel to the normal recording mode of operation and only needs to be implemented by way of software.

In accordance with the invention a respective comparison can e.g. take place within a scanning pattern or within a distance image. In the latter case a plurality of distance image points that belong to different scanning patterns of the same distance image can be compared to one another. For example, amounts of distance image points can be compared to one another that lie directly next to one another on the respective object—with respect to the spatial resolution of the apparatus. However, also different distance images can be used for the comparison in such a manner that e.g. one or more distance image points from a first distance image are compared to the or to those corresponding distance image point(s) of a subsequent distance image. For example, amounts of distance image points can be compared to one another that directly follow one another—with respect to the time resolution of the apparatus. Consequently, a spatial and/or a timely vicinity of the distance image points to be compared to one another can be used.

For self-diagnostics of the apparatus, also a reference recording scenario can be drawn on in which a check is made whether a reference object can still be securely detected. In accordance with such an embodiment reference distance image points associated with a reference object are initially determined, in particular under exactly defined recording conditions. Test distance image points corresponding to the reference distance image points are determined at regular or irregular spacings in time and are compared to the reference distance image points for carrying out the self-diagnostics. A deviation lying outside of a pre-definable or predefined tolerance is then treated as a non-intended state, in particular as an interference or an error.

The reference object can be characterized by precisely defined properties, in particular by way of precisely defined remission properties, e.g. a certain degree of remission (quotient of the illumination density of the surface of the reference object remitted in the measurement direction and the corresponding illuminance of a reference white object). The size, as well as the remission properties (e.g. 5% degree of remission) of the reference object are determined on consideration of those objects that shall still be securely detected by means of the apparatus and/or the method. The reference object is arranged in the recording region of the apparatus preferably at a precisely defined position, wherein the distance (e.g. 20 m) between the reference object and the apparatus is preferably that distance up to which the objects can just still be securely detected. One can also refer to this maximum measurement distance as a "boundary distance".

The reference object can be fixedly positioned in the recording region of the apparatus, wherein the position of the reference objects relative to the apparatus can be constant. The reference object can e.g. be fastened at a movable crane or integrated into this. Additionally, the apparatus can also be attached to the crane and indeed in such a manner that the position of the reference object relative to the apparatus is known at least in certain movement configurations of the crane, wherein self-diagnostics can be carried out in one such specific movement configuration. Preferably the reference object and the apparatus are always identically positioned relative to one another independent of a crane movement in such a manner that self-diagnostics can be carried out at practically any arbitrary point in time. The reference object can directly be an element or a structure of the crane whose reference distance image points merely have to be determined once. One can thus omit the fastening of a separate reference object. The said predetermined remission properties can still e.g. be realized with a suitable color coating of the crane element selected as a reference object. It is also plausible that a reference object is fastened to the apparatus or integrated into this e.g. within or outside of a housing of the apparatus.

The reference distance image points are such distance image points that lie on the exactly defined and positioned reference object. The reference distance image points are preferably generated at exactly defined recording conditions. Certain weather conditions are thus required for the recording, in particular for an external use, in particular with regard to which reference object should just still be securely detected (e.g. a certain degree of precipitation, such as fog).

The reference distance image points are preferably stored and can be read out for carrying out self-diagnostics. The test distance image points image the distances of the reference object at least essentially at the same points. For checking the secure function of the apparatus, the test distance image points are compared to the reference distance image points. It can for example be determined that a certain number of test distance image points (e.g. at least 50%) must essentially be like the reference image points in order to confirm a secure and/or error-free functional principle of the apparatus. In the other case, e.g. due to bad weather conditions, an interference is detected that can lead to an adaptation or to a stopping of the work process.

The comparison of the distance image points to the reference distance image points can take place in a variety of ways. Thus, for example, the measured distance values can be compared to one another that should be in as good an agreement as possible. If this is not the case then a non-intended state is present. Apart from the distance image values, also the relative measurement amplitudes of the respectively concerned transmitters can be considered, this means it is determined which portion of the measurement radiation transmitted for the generation of test distance image points is actually received at the reception unit. Under certain weather conditions it is possible that the correct distance can still be measured; however, the measurement amplitude is already very small, wherein the signal-to-noise ratio takes on critical values. This can already be sufficient for a limited reliability of the apparatus. A non-intended state can thus already then be present when a certain portion of test distance image points has measurement amplitudes that lie beneath a threshold value that is defined on the basis of the measurement amplitude of the corresponding reference distance image measurement points. Preferably the comparison between the test distance image points and the reference distance image points is based both on the respective distance values and also on the respective measurement amplitudes.

To increase the reliability of the apparatus at least two different transmitters and/or reception units or at least two different groups of transmitters and/or reception units can be controlled separate from one another, in particular via a respective own interface (e.g. Ethernet). Likewise the determination of the individual distance image points that can be carried out with the groups of transmitters and/or reception units takes place separately or separate from one another.

The invention further relates to a method of monitoring a, in particular at least partly automated, work process by means of the apparatus described in the forgoing that can in particular be operated in accordance with the above-described method. The monitoring process is characterized thereby that a three-dimensional monitored space is defined around at least a part of a monitored object, wherein distance image points lying within the monitored space are determined and a determination is made whether an interfering object is present in the monitored space on the basis of the distance image points lying within the monitored space.

The monitored space is a "virtual" space that is defined by a set of distance values and angular values of the apparatus. In particular the limits of the monitored space are defined by distance and angular values. Angular dependent distance image points measured with respect to an object by means of the apparatus can thus be checked by way of calculation, this means by evaluating the measured distances and the associated angular values with respect to distance and angular values defining the monitored space, to see where they lie with respect to the monitored space, in particular whether they lie within our outside of the monitored space in such a manner that the apparatus can determine whether the monitored space is infringed by the concerned object or not, in particular whether the monitored object is thus endangered or not by the concerned object.

In accordance with the so far used terminology of a respective "object" that is present in the recording region of the apparatus and that is detected by way of the distance image points also the mentioned monitored object and the interfering object are such objects. The monitored object is, however, an object that is the subject of spatial monitoring. For this purpose a monitored space is defined around the monitored object that is monitored by means of the apparatus purely optically and/or by way of calculation to such an extent to see whether an interfering object penetrates or has penetrated the monitored space and thus represents a potential danger (danger of collision) for the monitored object. In other words a check is made whether a dangerous object infringes the monitored space.

If a dangerous object infringes the monitored space suitable measures can be taken as will be explained in the following in more detail. In particular a work process monitored by the apparatus can be actively influenced or a warning signal can be transmitted to a user entrusted with the work process.

The monitored space can be newly defined and/or updated at regular or irregular spacings in time. In particular the monitored space can be moved together with the monitored object, this means the monitored space can track the monitored object.

The monitored space can be defined on consideration of the maximum movement speed to be expected—of the monitored object or of the interfering objects coming into question. Thus, the monitored space can be larger, the larger the current movement speed of the monitored object is, respectively the larger the movement speed for potential interfering objects is expected. In this way the risk of a collision of the monitored object with an interfering object interfering the monitored space can be reduced.

The monitored space can even be adaptively changed, wherein in particular the shape and/or the size of the monitored space can be defined in dependence on the monitored work process, in particular in dependence on the kinematics or the dynamics of the monitored object. The monitored space is thus not configured as statically continuous, but rather can be adapted in an intelligent manner. The risk of collision can thus be even further reduced without influencing the work process by an excessive prudence or be endangered by too high a risk.

The work process can generally be adapted to such an extent that a collision between a monitored object and an interfering object can be avoided without stopping the work process. It is naturally possible to stop the work process on an impending collision. Alternatively, it is however also possible to adapt the kinematic and/or the dynamic extent of the work process e.g. by avoiding and/or slowing down in as far as a collision can still be securely avoided hereby. An advantage is of this is that the work process does not have to be abruptly stopped, but can be modified in a suitable manner. Undesired emergency break processes that could e.g. negatively influence the work efficiency are avoided at least to a certain degree in this way, this means on the danger of a collision an attempt is made to avoid a collision by way of "as mild as possible means" this means in an intelligent manner.

In accordance with an embodiment the monitored space is sub-divided into a plurality of protective volumes, in particular into two or three protective volumes, wherein preferably the protective volumes are at least partly nested within one another. For example, the protective volumes could lie in one another in a shell-like or layered-like manner. In this way the protective volumes can extend around the monitored object like the skin of an onion. The division of the monitored space into protective volumes can in particular be used with a view to the above-described intelligent adaptation of the work process, wherein the apparatus can determine in which protective volume(s) an interfering object is present. Thus, the work process can be adapted differently in dependence thereof which protective volume was infringed by a respective interfering object.

For example, the work process can be stopped when an interfering object infringes an interior protective volume. In contrast to this if an outer protective volume is infringed in which the interfering object still has a larger spacing from the monitored object, e.g. an avoiding movement of the monitored object can be carried out in such a manner that a non-desired stopping (e.g. "emergency break") of the work process can be avoided.

In accordance with a preferred embodiment, an internal, a middle and an external protective volume are provided. The work process is stopped when an interfering object infringes the internal protective volume. If the interfering object infringes the middle protective volume, a movement of an object movable, in particular an object carrying the apparatus, in the work process is slowed down. When the inferring object infringes the outer protective volume, a kinematic track of the movement of the object is adapted, in particular into an avoidance movement.

In order to further increase the reliability of detection of interfering objects at least two apparatuses can be provided that are respectively associated with the monitored space, wherein the monitored spaces overlap one another and distance image points falling into the overlap region are compared to one another and wherein a deviation lying outside of a pre-definable or predetermined tolerance is treated as a non-intended state, in particular as an interference or an error.

The concept of a redundant monitoring with a plurality of transmitters of an individual apparatus (this means on the plane of distance image points of an individual distance image) can in this way be avoided to such an extent that certain regions can be redundantly monitored or monitored twice by two apparatuses. In this region the monitored spaces of the apparatuses overlap one another.

The advantages of the described methods and apparatuses can be utilized in a whole series of plausible applications. As a specific example container terminals are mentioned in this respect in which containers or other objects are transferred by way of at least partly automated work processes between two transport means. The containers can primarily be considered as monitored objects as they have to be protected from collisions under all circumstances; however, they can also be interfering objects. Interfering objects in this case of application are in any way only those objects that represent a relevant risk of collision, this means in particular other containers or elements of container cranes and the like; however, no non-hazardous objects such as birds. Monitored objects can however also be elements of container cranes (e.g. buttresses, travelling trolleys) that should likewise possibly be protected from collisions. A monitored object can thus at the same time also be an interfering object for a further monitored object. The allocation of objects in the recording region with respect to monitored objects or interfering objects can be carried out in a software-based manner from the distance images by the apparatus itself, however, can also be carried out by external recognition units. Hereby it is possible that a plurality of objects is simultaneously treated at the same time as monitored objects by an apparatus.

It is understood that both a monitored object as well as an interfering object can be movable objects or objects fixed in position. Thus, the above-mentioned work process can relate both to a movement of a monitored object as well as an interfering object. An interfering object moving in the framework of an automated work process can e.g. be a buttress or a gripper of a movable portal crane.

An apparatus in accordance with the invention for monitoring a monitored object can e.g. be fastened to a movable installation, in particular to a portal crane (e.g. to a buttress or a travelling trolley). Thus, the apparatus itself can be movable. Also in such a case the described monitoring concept can be used, wherein e.g. a stationary container can be reliably monitored and protected. The related monitored space can be adapted for this purpose in the framework of a movement of the apparatus in such a manner that this remains around the container in the desirable manner and is not, for example, moved together with the apparatus.

An advantage of the method in accordance with the invention respectively of the apparatus in accordance with the invention lies in a short reaction time (latency). An inference—be it due to an error function of the apparatus or of an interfering object interfering the monitored space—can in principle be recognized very fast, practically in real time. This, on the one hand, lies therein that for self-diagnostics or for recognizing an interfering object, the use of merely one apparatus in accordance with the invention is sufficient, this means that a plurality of apparatus do not have to be synchronously controlled and the corresponding measurement results do not have to be commonly evaluated, as was previously the case.

A reason for the approach selected in the current state of the art of using a plurality of apparatus lies therein that so far no apparatus was made available with which the monitored spaces could be monitored with a sufficiently high frequency in time. In contrast to the prior art, the apparatus in accordance with the invention permits the recording of distance images e.g. with a frequency of 10 Hz in such a manner that monitored objects can be monitored with a sufficiently high image rate. A further reason for the short reaction time lies therein that the self-diagnostics can be carried out in parallel to a normal mode of operation of the apparatus. So far used apparatus had to be operated in a specific diagnostic mode of operation which necessarily caused longer reaction times.

Further embodiments of the invention are stated in the dependent claims, the description and in the drawing.

The invention will be described merely by way of example with reference to the schematic drawing.

FIG. 2 shows the apparatus of the FIG. 2 in a side view.

Figure 1:
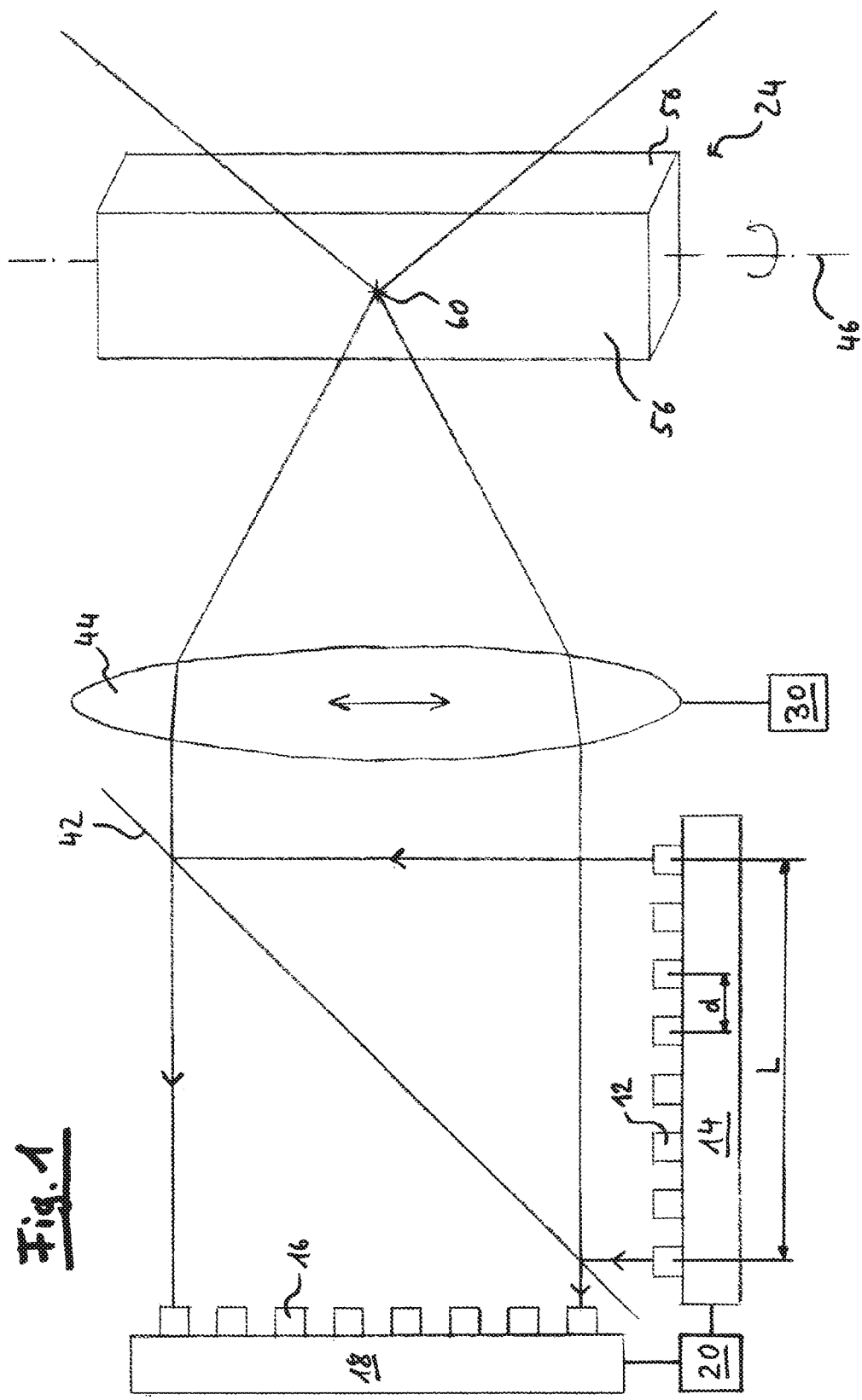
FIG. 1 shows a schematic illustration of an apparatus in accordance with the invention in a top view.

FIG. 3 schematically shows the assembly of a distance image in accordance with the invention from individual distance image points.

FIG. 4 shows an alternative embodiment of an apparatus in accordance with the invention.

FIG. 5 shows a beam splitter and selected further elements of an apparatus in accordance with the invention in a perspective view.

FIG. 6 shows a recording region spanned by an apparatus in accordance with the invention.

FIG. 7 shows a monitored object that is surrounded by a monitored space.

The apparatus illustrated schematically in FIG. 1 for recording distance images comprises eight transmitters 12 for the transmission of radiation that are arranged in a transmitter array 14 and are respectively configured as laser diodes. The apparatus further comprises eight receivers 16 that are arranged in a receiver array 18 and that are respectively associated with one of the transmitters 12. Laser beams transmitted by the transmitters 12 and running back to the receivers 16 are indicated by corresponding lines, with respective radiation directions being indicated by directional arrows. The transmitters 12 each have a radiation characteristic with a certain divergence and the said lines in this connection represent central rays. A geometric beam splitter 42 configured as a completely reflecting mirror ensures that radiation transmitted by the transmitters 12 is deflected into a recording region. Radiation reflected back into the apparatus passes the beam splitter with reference to FIG. 1 before and behind the beam splitter 42 and is incident at the respective receiver 16. Form and function of the beam splitter 42 will be described in the following in detail with reference to the FIGS. 2 and 5. The control of the transmitters 12 and the evaluation of signals of the receiver 16 are carried out by a control and evaluation unit 20.

The apparatus further comprises a lens 44 translatory movable to and fro by means of a displacement unit 30 as well as a rotating mirror 24 configured as a polygonal mirror that has four deflection surfaces 56 and that rotates about an axis of rotation 46. Each transmitter 12 transmits a divergent bunch of radiation whose beams are deflected to a parallel bunch of radiation by way of the lens 44. The bunches of radiation of the transmitters only cover a relatively small part of the lens 44. The lens 44 has an outer focal point 60 that is aligned in such a manner that it is present at approximately the respective active deflection surface 56. The transmitter 12 and the lens 44 are aligned in such a way that they interfere with the parallelized bunches of radiation of the respective transmitter 12 approximately in the outer focal point 60. The respective laser bunches of radiation are repeatedly deflected from the deflection surfaces 56 into a recording region, in FIG. 1 out of the plane of the drawing.

If the lens 44 moves translatory in its movement direction, in the present instance in parallel to the axis 46, then all transmitted and received bunches of radiation are deflected by a small angle that is determined by the displacement of the lens 44.

The transmitters 12 are distributed in the array 14 over a maximum longitudinal extent L of the transmitter array and each have a transmission spacing d between one another. The receivers 16 are correspondingly distributed in the receiver array 18.

In FIG. 2 the apparatus of the FIG. 1 is illustrated in a side view without maintaining its scale. The viewing direction of the observer in this connection extends in the direction of the axis of rotation 46 of the rotating mirror 24. A respective laser beam emanates from a transmitter 12 of the transmitter array 14 not shown in FIG. 2, is deflected by the beam splitter 42 passes the lens 44 and is deflected by a deflection surface 56 of the rotating mirror 24 into the recording region 50. In this connection a respective laser beam passes through an outlet window 48 configured in a housing 62 of the apparatus. Besides the outlet window 48 the housing 62 of the apparatus is closed. A usable scanning angle region 26 is in this way influenced by the shape of the polygonal mirror 24 and/or by the size of the outlet window 48.

As is also evident from FIG. 2, the beam splitter 42 is configured as relatively narrow in such a manner that beams reflected from the recording region 50, which are merely indicated on the left hand side of the lens 44, arrive at the receivers 16 laterally past the beam splitter 42. The beam splitter has a comparatively elongate trapezoidal shape whose function will be described in detail in the following with reference to FIG. 4.

In FIG. 2 the outermost beams of the scanning angle region 26 are indicated in a dashed manner. Likewise indicated in a dashed manner are the positions of the deflection surface 56 corresponding to the outermost beams. The scanning angle region 26 in this case amounts to approximately 90°.

An exemplary distance image 52 having a plurality of distance image points 22 is shown in FIG. 3, however, with distance values of the distance image points not being illustrated.

For reasons of simplicity it is assumed for the purpose of illustration that the apparatus in accordance with the invention recording the distance image 52 merely has two transmitters. Apart from this the apparatus is configured just like the one corresponding to FIGS. 1 and 2. For reasons of simplicity it is further assumed that the lens 44 is not continuously displaced, but rather has a discrete position, this means is stationary as long as a respective deflection surface 56 is active, this means is impinged by both transmitters. With respect to FIG. 3 horizontal image point rows are referred to as columns and vertical image point rows are referred to as lines, wherein an actual spatial alignment of an apparatus in accordance with the invention can naturally be different.

The functional principle of such an apparatus in accordance with the invention is as follows: A respective pulsing transmitter 12 in connection with a deflection surface 56 of the rotating polygonal mirror 24 generates a column of distance image points 22 for a respective discrete position of the lens 44. For a first position of the lens 44, the resultant distance image points 22 of the two transmitters 12 are indicated by empty circles in FIG. 3. For a second position of the lens 44 the resultant distance image points 22 are indicated by crossed circles. For a third position of the lens 44 the resultant distance image points 22 are indicated as a circle having a point in the center. By way of the individual points it is indicated that the shown pattern correspondingly proceeds in the respective direction.

All distance image points 22 together result in the desired distance image 52. This has a column height 26 which corresponds to a scanning angle region covered by way of one of the deflection surfaces 56 of the rotating mirror 24 (cf. FIG. 2). Furthermore, the distance image 52 has a line width 32.

The spacings between respectively adjacent distance image points 22 define a column resolution 38 respectively a line resolution 40. Associated columns, this means columns generated at the same time for a rotation of the polygonal mirror 24 by means of a deflection surface 56 together form a scanning pattern 54. The scanning patterns 54 are thus respectively generated by all transmitters 12—in the simplified example of FIG. 3, this means by two transmitters—during a running through of a single deflection surface 56 of the rotating mirror 24. The spacing of adjacent gaps of directly consecutive scanning patterns 54 then corresponds to the line resolution 40.

The scanning pattern 54 is displaced in a displacement direction 36 by way of the lens 44 movable by means of the displacement unit 30, in the present instance the displacement direction extends perpendicular to a scanning direction 28 of the rotating mirror 24. In this connection the scanning pattern 54 is totally displaced by an offset 58 along the displacement direction 36 per distance image 52. This total offset 58 is selected in such a manner that the column of the one transmitter 12 is not imaged on a column of the other transmitter 12, thus expressed generally not onto one column of the transmitter 12 adjacent thereto in the displacement direction 36. The line width 32 of the distance image 52 is thus equal to the sum of the offset 58 and the (n_transmitter−1) multiple of the spacing 34 between two adjacent columns, wherein, in this embodiment, the number of the transmitters n_transmitter=2. The column spacing 34 in this connection corresponds to a transmission angle resulting from the spacing d between the transmitters 12.

As the offset 58 almost corresponds to the column spacing 34, the line width 32 practically corresponds to the n_transmitter multiple of the transmitter spacing d for n_transmitter transmitters 12.

The distance image 52 consequently has a width and a height in the recording region 50, wherein the height is determined by the scanning angle region 26 and the width is determined by way of the sum of the maximum extent of the transmitter array in the displacement direction (in FIG. 3 for two transmitters this means the column spacing 34 that results from the transmitter spacing d) and the offset achieved by means of the displacement unit 30 this means in the present case the movement of the lens 44.

In FIG. 4 a transmitter array 14 having a plurality of transmitters 12 and a receiver array 18 having a plurality of receivers 16 are shown. The optical path is shown for the respectively outermost transmitter 12 or receiver 14, wherein the beams stemming from the left transmitter 12 are illustrated with dashed lines and the beams stemming from the right transmitter 12 are illustrated with solid lines. The transmission radiation of the transmitters 12 is divergent which is indicated by way of fanned-out beams. After divergent light beams of a respective transmitter 12 pass a lens 44 they propagate in parallel to one another, but not in parallel to the light beams of other transmitters 12. Bunches of radiation of respective transmitters are thus parallelized by way of the lens 44.

The transmitters 12 are aligned in the transmitter array 14 in such a manner that the beams essentially only propagate through a middle region 64 of the lens 44 after a reflection at a beam splitter 42. It is hereby utilized that a lens, in particular for manufacturing reasons, frequently has better optical properties in the middle region than in a boundary region. The beams of the transmitters 12 thus intersect in the lens 44. In contrast to this, the beams of the transmitters 12 intersect at the deflection unit having regard to the embodiment of the FIG. 1.

The beams parallelized by the lens 44 are deflected by a deflection unit not illustrated in this instance (principally effective like in the embodiment of FIG. 1) into a recording region, in which the beams are incident at an object and are reflected back to the apparatus. With regard to these reflected beams essentially the complete lens 44, this means not only the middle region 64, brings about a bunching of the incident beams to the respective receivers 16 with respect to the vertical direction of FIG. 4.

By means of FIG. 4 the function of the trapezoidal shape of the beam splitter 42 mentioned in the FIG. 2 can also be emphasized. Also having regard to the embodiment of the FIG. 4 the beam splitter 42 is trapezoidal which is however not visible in this instance, as the beam splitter 42 is illustrated from the side. The beam splitter 42 is relatively narrow on the left hand side at the bottom and becomes wider towards the right upper side. The divergence of the respective transmitters 12 is equal; however, the beam at the left transmitter 12 is incident after a shorter propagation path onto the beam splitter 42 than the beams of the other transmitters 12 in such a way that the beam respectively the bunches of radiation of the left transmitter 12 have a smaller width and/or extend at the beam splitter 42 in comparison to the other transmitters 12. For this reason the beam splitter 42 can be configured as relatively narrow toward the left bottom. The beams of the right transmitter 12 possess the largest extent at the beam splitter 42 which is why the beam splitter 42 is configured wider here.

FIG. 5 shows a perspective view of an apparatus in accordance with the invention. A transmitter array 14 having transmitters 12 and a receiver array 18 having receivers 16 is illustrated, with only a respective outer transmitter 12 and receiver 16 being illustrated. A beam splitter 42 deflects beams transmitted by the transmitters 12 by way of a lens 44 and in this way to a non-illustrated deflection unit. The beam splitter 42 is configured as a complete mirror at an inclined side and comprises two screening means 66 configured as black surfaces. The screening means 66 screen the optical path of the transmitter 12 in such a way that essentially no light of the transmitters 12 can arrive at the receiver 16 without it passing at least the lens 44 and in particular the recording region. By way of the black surfaces 66 a divergence difference of the transmitters 12 can moreover be compensated.

The invention and its embodiments can also be emphasized by way of the following calculation for an exemplary embodiment. The stated values are not necessarily exact, but rather have been rounded off, in particular to the last stated point.

For reasons of simplicity, it is assumed that the calculation and processing capacities of a connected evaluation unit does not represent a limitation. Also a range of the apparatus is not considered for reasons of simplicity. However, in practice, it can occur that these parameters have to be considered on designing and operating the apparatus.

A spatial angular region to be scanned should, for example, amount to 90°×32°, this means 1.571×0.559 rad. In this respect a resolution A=1 mrad in both spatial angular directions should be realized. The complete number of image points per distance image n_image points thus results as 878,189, wherein a respective column has 1571 image points and a respective row has 559 image points.

The number of the transmitters amounts to n_transmitter=8. In this way each transmitter has to generate 109,774 image points per distance image.

A respective GaAs laser diode used as the transmitter is operated in a continuous mode of operation with a pulse rate Louise=100 kHz. However, not each of the pulses transmitted by a respective transmitter results in a usable distance image point. The portion of the pulses which actually produce usable distance image points can also be referred to as optical degree of efficiency and is a property of the recording apparatus. For example, on use of a polygonal mirror with n_mirror=4 deflection surfaces approximately half of all pulses of a respective transmitter are not deflected into the recording region, but rather in non-usable directions. A lens configured as movable to and fro or such a displacement unit comprising such a lens, for example, has a speed extent for a respective movement reversal that has disadvantageous effects on the arrangement of the resultant distance image points in such a way that the pulses which coincides with the reversal in time at least essentially can be omitted. The portion of the usable pulses can in this respect e.g. amount to 0.8.

Totally an optical degree of efficiency of 0.4 thus results for the mentioned example. For the desired, actually usable 109,774 image points per transmitter and distance image thus a total of 274,435 pulses have to be transmitted by each transmitter per distance image. For this purpose a respective laser diode at Louise=100 kHz requires approximate 2.74 s which corresponds to a distance image rate f_image=0.36 Hz.

In this connection the lens travels a to and fro movement per distance image. The frequency of the lens movement Liens, this means the rate with which the lens is moved to and fro in a second or in other words the displacement frequency is thus, in particular half the size of f_image.

A respective row has 559 distance image points as stated above. For n_transmitter=8 a respective transmitter has to provide approximately 67 image points that are distributed along the lines by means of the displacement unit. In other words a respective transmitter has to be imaged onto 67 columns which corresponds to 67 cycles of deflection surfaces of the deflection unit. Having regard to a polygonal mirror having n_mirror=4 this thus results therein that the polygonal mirror has to be rotated approximately 16.8 times per image about its own axis. In this way the rotational frequency of the mirror f_mirror=16.8*f_image which for the above averaged value f_image=0.36 Hz for f_mirror=6.0 Hz.

Having regard to this exemplary embodiment f_lens and f_mirror can additionally be freely selected during operation. Hereby, for example, the image rate f_image can be set online in dependence on the resolution A as required. For example, in the following example calculation, the image rate f_image can be increased by the factor 10. Apart from the f_lens and f_mirror in this example all other parameters are like those of the previous example. In particular f_pulse of the laser diodes remains constant.

The value for f_image should thus be increased by the factor 10 and should now amount to 3.6 Hz rather than 0.36 Hz. Due to the constant pulse rate f_pulse the number of image points to be recorded per unit of time likewise remains constant. Consequently, the number of the image points for f_image=3.6 Hz likewise reduces by the factor 10 to a total of 87,819 image points per image. Correspondingly, the angular spacing between two distance image points increases with the root of 10. The resolution A thus in this case amounts to 3.16 mrad (rather than previously A=1 mrad).

It thus becomes evident, in particular by way of the aforementioned example calculation example that a relatively fast image rate is enabled for a good resolution in a particularly simple manner by way of the apparatus in accordance with the invention for the recording of distance images and indeed with a comparatively simple opto-mechanical overall arrangement that in particular only requires a single and relatively slow rotating polygonal mirror and moreover merely requires a single, in turn comparatively slow optical element that is movable to and fro, such as e.g. a common transmission and reception lens.

Resolution respectively image rate can also still be further improved by simple means, for example through the use of an array with even more transmitters, e.g. with n_transmitter=16 and/or through the use of transmitters with a higher pulse frequency. However, in all cases the advantage is still maintained that no rotating or movable parts are present outside of a housing of the exemplary apparatus and in this way safety and maintenance friendliness is ensured. Naturally, also the covered spatial angle can be adapted by way of simple measures for a given case of application. Also it has been emphasized hereby that image rate and resolution can be set with simple means, namely in particular by way of variation of a movement speed of a deflection unit and/or of a displacement frequency of a displacement unit. The apparatus can thus, for example during operation, be adapted to the most diverse tasks and operating situations.

The previously described apparatus can e.g. also be considered as a plurality of 2D-scanners which have a common optics and in this way together form a 3D-scanner that can also be referred to as a 3D sensor or a 3D scanner sensor, as the apparatus considered as a whole does not need to be moved.

In FIG. 6 a scenario is shown purely schematically with an apparatus 68 in accordance with the invention that covers a recording region 50. The apparatus 68 can, for example, be fastened to a portal crane of a non-shown container terminal. The recording region 50 can thus e.g. configured pyramid-shape. Objects that are present within the recording region 50 can be detected by the apparatus 68.

In FIG. 7 a monitored object 70 is shown that can e.g. be a container which is transferred by means of a portal crane (not shown) in a container terminal (not shown) and is monitored by means of the apparatus 68, such as it is e.g. illustrated in FIG. 2.

A three-dimensional monitored space 72 is defined around the monitored object 70 with the monitored space being subdivided into three protective volumes 74a, 74b, 74c. The protective volumes 74a, 74b, 74c are configured approximately parallel-epiped with respect to their contour and are nested within one another, wherein the protective volume 74a forms an inner protective volume, the protective volume 74b forms a middle protective volume and the protective volume 74c forms an outer protective volume. The protective volumes 74a, 74b, 74c, thus extend layer-like or onion-skin-like around the monitored object 70 and directly bound one another. The outer contour of the outer protective volume 74c is not shown for reasons of illustrational clarity.

If an interfering object 76 now infringes one or more protective volumes 74a, 74b, 74c then a course of a work process can thus be directly adapted. In particular the work process can be stopped, slowed down or be adapted with respect to a kinematic movement. Thus, e.g. a movement of the monitored object 70 can be modified in such a way that a collision with the interfering object 76 is reliably prevented without the movement having to be stopped for this purpose.

Having regard to this concept of a three-dimensional monitored space and/or a nesting within one another of protective volumes, reference is also made to the embodiments in introduction in order to avoid repetitions.

LIST OF REFERENCE NUMERALS 12 transmitter
14 transmitter array
16 receiver
18 receiver array
20 control and evaluation unit
22 distance image point
24 rotating mirror/polygonal mirror
26 column height/scanning angle region
28 scanning direction
30 displacement unit
32 line width/displacement angular region
34 column spacing/transmission angle
36 displacement direction
38 column resolution
40 line resolution
42 beam splitter
44 lens
46 axis of rotation of the rotating mirror
48 outlet window
50 recording region
52 distance image
54 scanning pattern
56 deflection surface
58 offset
60 outer focal point
62 housing
64 middle region
66 black surface
68 apparatus
70 monitored object
72 monitored space
74a-c protective volumes
76 interfering object
d transmitter spacing
L maximum longitudinal extent of the transmitter array

The invention claimed is:

1. An apparatus for the recording of distance images respectively having a plurality of distance image points, comprising
a plurality of transmitters arranged in an array respectively for the transmission of electromagnetic radiation into a recording region and at least one reception unit for the detection of radiation reflected from the recording region;
an evaluation unit for determining distances of objects at which the transmitted radiation is reflected, with the distances each forming a distance image point;
a deflection unit which repeatedly deflects the transmission radiation into a scanning direction within a scanning angle region in order to consecutively generate a plurality of scanning patterns of distance image points per distance image;
a displacement unit which displaces consecutive scanning patterns against one another in a displacement direction by way of relative movements of optical elements;
each distance image comprising a plurality of scanning patterns of distance image points displaced against one another; and
wherein the recording region corresponds to a spatial angle of D×V that can be covered by means of the transmission radiation, wherein D is the scanning angle region that can be covered by means of the deflection unit and V is the displacement angular region that extends perpendicular to the scanning angle region and that results from the sum of the corresponding expansion of the transmitter array and a predefined offset which can be generated by means of the displacement unit and wherein preferably D lies approximately in the range of 45° to 120° and V approximately lies in the range of 12° to 45°.

2. An apparatus in accordance with claim 1, wherein the displacement unit comprises a movable optics, in particular a translator movable optics, in particular a prism, a mirror or a lens, preferably a common transmission and reception lens.

3. An apparatus in accordance with claim 1, wherein the displacement unit comprises an actuator that moves an optics arranged between the transmitter array and the deflection unit, the transmitter array and/or the reception unit relative to the deflection unit.

4. An apparatus in accordance with claim 1, wherein a displacement movement that can be generated by means of the displacement unit is a periodic to and fro movement, in particular having a displacement amplitude corresponding to a transmitter spacing (d) between two transmitters lying directly adjacent to one another and/or having a displacement frequency that lies between a few Hz and a few ten Hz.

5. An apparatus in accordance with claim 1, wherein the transmitter array has a maximum longitudinal extent (L) and a maximum transverse extent perpendicular to the longitudinal extent (L), wherein the transverse extent is smaller than the longitudinal extent (L), in particular is a multiple times smaller than the longitudinal extent.

6. An apparatus in accordance with claim 1, wherein the transmitters are arranged on a straight line in the array, wherein preferably the transmitters are uniformly spaced apart along the straight line.

7. An apparatus in accordance with claim 1, wherein the scanning direction extends perpendicular to an effective longitudinal extent (L) of the transmitter array, wherein the displacement direction extends perpendicular to the scanning direction and in particular extends in parallel to the effective longitudinal extent (L) of the transmitter array.

8. An apparatus in accordance with claim 1, wherein the number of transmitters lies between 4 and 32, in particular amounts to 8 or 16; and/or in that the spacing (d) between two transmitters lying directly adjacent to one another lies in the range of 1 to 12 mm, in particular amounts to approximately 6 mm; and/or in that the maximum longitudinal extent (L) of the transmitter array lies in the range of 32 to 96 mm, in particular amounts to approximately 42 mm.

9. An apparatus in accordance with claim 1, wherein the spacing (d) between two transmitters lying directly adjacent to one another corresponds to a transmission angle in the range of 2° to 12°, in particular to approximately 4.3°.

10. An apparatus in accordance with claim 1, wherein the deflection unit is configured as a polygonal mirror that is provided with a plurality of n deflection surfaces that can consecutively be impinged by the transmission radiation and that each cover the same angular range of at least approximately 360°/n, wherein preferably n=2, 3, 4, 5, 6, 7 or 8, with n in particular being n=2, 4 or 6.

11. An apparatus in accordance with claim 1, wherein the reception unit comprises a plurality of receivers arranged in an array, wherein preferably exactly one transmitter is associated with each receiver and vice versa.

12. An apparatus in accordance with claim 1, wherein the transmitter array, the reception unit, the deflection unit and the displacement unit are arranged in a common closed housing, wherein in particular the housing has a common outlet window for the radiation transmitted into the recording region and for the radiation reflected from the recording region.

13. An apparatus in accordance with claim 1, wherein the apparatus comprises a common transmission and reception lens, wherein in particular the transmitters are aligned with respect to the lens in such a manner that the transmission radiation passes a common middle region of the lens or such that bunches of radiation from the transmitters are incident essentially in parallel to one another on the lens and bunches of radiation exiting the lens converge, in particular intersect with one another in an outer focal point.

14. An apparatus in accordance with claim 1, wherein the evaluation unit has a plurality of time measurement units for determining the distances on the basis of a respective radiation time of flight.

15. An apparatus in accordance with claim 14, wherein at least two transmitters are associated with a respective time measurement unit.

16. An apparatus in accordance with claim 1, wherein the apparatus has a geometric beam splitter for the geometric separation of a transmission radiation region from a reception radiation region.

17. An apparatus in accordance with claim 16, wherein the reception radiation region is screened from the transmission radiation region.

\* \* \* \* \*